United States Patent
Inoko

(10) Patent No.: US 8,714,745 B2
(45) Date of Patent: May 6, 2014

(54) COLOR SPLITTER AND COMBINER SYSTEM AND PROJECTION DISPLAY APPARATUS

(75) Inventor: Kazuhiro Inoko, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 72 days.

(21) Appl. No.: 12/853,789

(22) Filed: Aug. 10, 2010

(65) Prior Publication Data
US 2011/0032487 A1 Feb. 10, 2011

(30) Foreign Application Priority Data

Aug. 10, 2009 (JP) .................................. 2009-185379
Jul. 7, 2010 (JP) .................................. 2010-154956

(51) Int. Cl.
*G03B 21/14* (2006.01)

(52) U.S. Cl.
USPC .......................................... 353/20; 359/706

(58) Field of Classification Search
USPC .................. 353/30–33, 20; 359/672–706
See application file for complete search history.

(56) References Cited

U.S. PATENT DOCUMENTS

| 7,207,681 B2 * | 4/2007 | Yamamoto ..................... 353/102 |
| 2005/0243279 A1 | 11/2005 | Kobayashi et al. |
| 2006/0256289 A1 * | 11/2006 | Fukuzaki et al. .............. 353/20 |

FOREIGN PATENT DOCUMENTS

| JP | 2000-039584 A | * 7/1998 | ............. G02B 27/18 |
| JP | 2006-047968 A | 2/2006 | |
| JP | 2006-343692 A | 12/2006 | |

OTHER PUBLICATIONS

Machine Tranlation of JP 2000-039584 A.*

* cited by examiner

*Primary Examiner* — Francis M Legasse, Jr.
*Assistant Examiner* — Jerry Brooks
(74) *Attorney, Agent, or Firm* — Rossi, Kimms & McDowell LLP

(57) ABSTRACT

A color splitter and combiner system includes a first transparent member located on an optical path between a first polarization beam splitter and an optical path combiner, and a second transparent member located on an optical path between a second polarization beam splitter and an optical path combiner. $0.05$ (mm)$<|t1/v1-t2/v2|<1.00$ (mm) is met, where t1 is a thickness of the first transparent member, t2 is a thickness of the second transparent member, v1 is an Abbe number of a material of the first transparent member, and v2 is an Abbe number of a material of the second transparent member.

12 Claims, 4 Drawing Sheets

PRIOR ART

COLOR SPLITTER AND COMBINER SYSTEM AND PROJECTION DISPLAY APPARATUS

BACKGROUND OF THE INVENTION

1. Field of the Invention

The present invention relates to a color splitter and combiner system configured to modulate a light flux emitted from a light source using a reflection type image display element (liquid crystal panel) and to display an image, and a projection display apparatus having the color splitter and combiner system.

2. Description of the Related Art

As a projection display apparatus configured to project and display a color image on a predetermined surface, a known projection display apparatus reflects and transmits two color light fluxes using one polarization beam splitter, and leads each color light flux to a corresponding reflection type liquid crystal display element (liquid crystal panel).

In many cases, an incident angle of the light incident upon the polarization splitting surface of the polarization beam splitter is not constant but has latitude. Hence, the incident light is not perfectly split into the transmission light and the reflection light on the polarization splitting surface, and the light to be originally transmitted is reflected or the light to be reflected is transmitted. This light will be referred to as unnecessary light hereinafter. Then, the unnecessary light interferes with the reflected image light that is incident upon and modulated by the corresponding reflection type liquid crystal display element, via the polarization beam splitter, and an interference pattern is projected on the screen. A projection display apparatus configured to reduce the interference pattern on the screen is known. U.S. Patent Application, Publication No. ("US") 2005/0243279 corresponding to Japanese Patent Laid-Open No. ("JP") 2006-047968, and JP 2006-343692.

The projection display apparatus disclosed in US 2005/0243279 reduces the interference pattern on the screen by making large an axial chromatic aberration of the projection lens itself. However, the flare in the single color band is likely to occur due to this axial chromatic aberration.

The projection display apparatus disclosed in JP 2006-047968 reduces the interference pattern on the screen using a chromatic aberration plate (plane parallel plate) that is provided with an axial chromatic aberration. At this time, the spherical aberration occurs due to the chromatic aberration plate. Even for a plate glass (plane parallel plate) that has generally no power as a lens, a spherical aberration actually occurs according to its thickness. Thus, the resolving performance tends to be lower on an optical path into which the plate glass is inserted than on an optical path into which no plate glass is inserted.

When the projection display apparatus disclosed in JP 2006-343692 reduces the interference pattern on the screen using the axial chromatic aberration lens, the image quality of the projection image tends to deteriorate due to the other influence on the image quality performance, such as a chromatic difference of magnification and a telecentricity of the projection lens.

SUMMARY OF THE INVENTION

The present invention provides a color splitter and combiner system and a projection display apparatus having the same, which can properly maintain the image quality of a projected image, and reduce an interference pattern on a screen.

A color splitter and combiner system according to one aspect of the present invention includes a first polarization beam splitter configured to lead first color light to a first reflection type image display element and to analyze first reflected light from the first reflection type image display element, a second polarization beam splitter configured to lead second color light to a second reflection type image display element, to analyze second reflected light from the second reflection type image display element, and to lead third color light to a third reflection type image display element, and to analyze third reflected light from the third reflection type image display element, an optical path combiner configured to combine the first color light emitted from the first polarization beam splitter with the second color light and the third color light that are emitted from the second polarization beam splitter, a first transparent member located on an optical path between the first polarization beam splitter and the optical path combiner, and a second transparent member located on an optical path between the second polarization beam splitter and the optical path combiner, wherein $0.05$ (mm)$<|t1/v1-t2/v2|<1.00$ (mm) is met, where t1 is a thickness of the first transparent member, t2 is a thickness of the second transparent member, v1 is an Abbe number of a material of the first transparent member, and v2 is an Abbe number of a material of the second transparent member.

Further features of the present invention will become apparent from the following description of exemplary embodiments with reference to the attached drawings.

DESCRIPTION OF THE EMBODIMENTS

Figure 1:
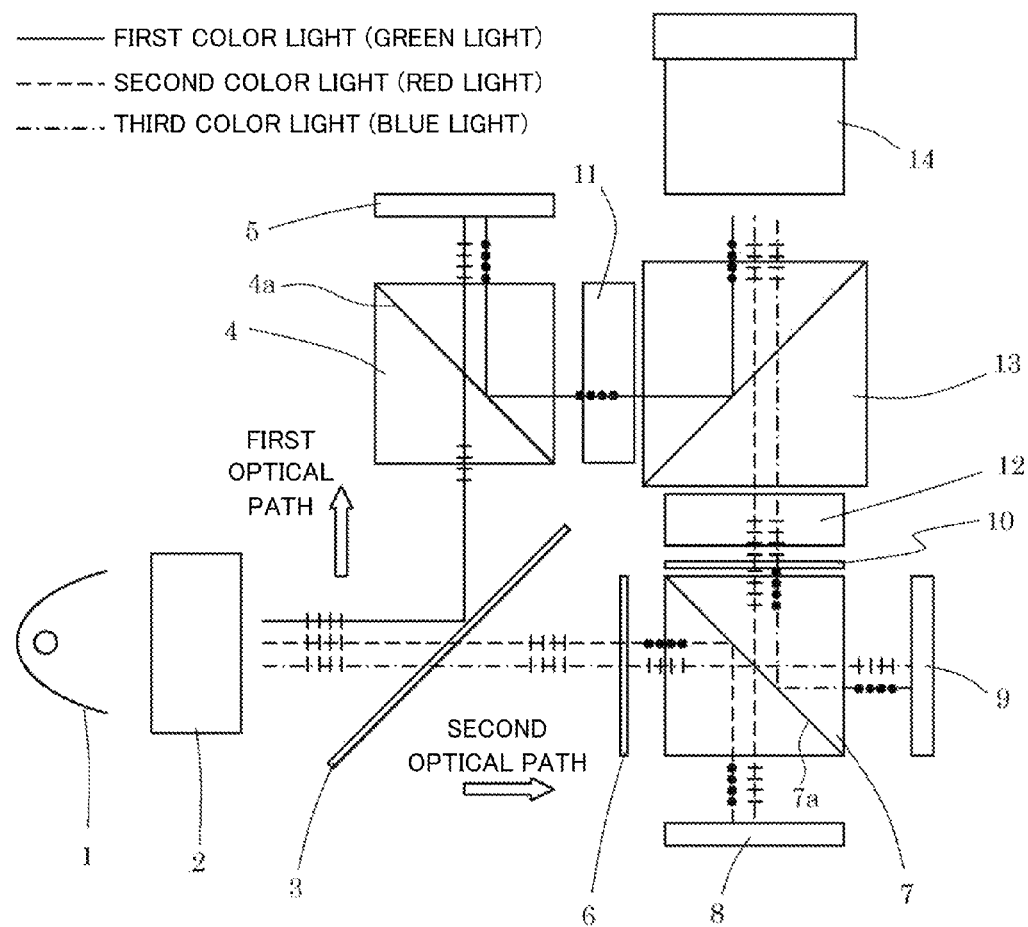
FIG. 1 is a schematic view of a principal part of a projection display apparatus according to an embodiment of the present invention.

Before an embodiment of the present invention is described in detail, a brief description will now be given of an outline of the color splitter and combiner system and a projection display apparatus according to the present invention with reference to FIG. 1. FIG. 1 illustrates the color splitter and combiner system and the projection display apparatus having the same. The color splitter and combiner system splits an incident light flux from an illumination optical system 2 into a plurality of color light fluxes, such as green light, red light, and blue light, having different wavelength bands using a color splitter 3, such as a dichroic mirror or a dichroic prism. Each color light is led to a predetermined surface, on which one of the reflection type image display elements 5, 8, and 9, such as a liquid crystal panel, is located. The light fluxes modulated by the reflection type image display elements on the predetermined surfaces are combined with one another by an optical path combiner 13, made of a polarization beam splitter, and emitted from one direction. Among the light fluxes split by the color splitter 3, one color light, such as green light, is led onto a first predetermined surface via a first polarization beam splitter 4. The light from the liquid crystal panel 5 provided on the first predetermined surface enters the first polarization beam splitter 4, and the optical path combiner 13 via a first transparent member 11.

On the other hand, the light that has transmitted through the color splitter 3 is split into two light fluxes (red light and blue light) by a second polarization beam splitter 7, and they are led to second and third predetermined surfaces. The light fluxes from the reflection type image display elements provided on the second and third predetermined surfaces enter the optical path combiner 13 via the second polarization beam splitter 7 and a second transparent member 12. The three-color light fluxes combined by the optical path combiner 13 are projected onto a predetermined surface, such as a screen S, by a projection optical system 14. Thereby, image information is formed on the screen surface S.

FIG. 1 is a schematic view illustrating a principal part of a projection display apparatus according to an embodiment of the present invention. (White) light emitted from a light source (unit) 1, such as a high-pressure mercury lamp, is shaped so as to illuminate the reflection type liquid crystal display panels 5, 8, and 9 using telecentric light fluxes. When the light source 1 is configured to emit non-polarized light, a polarization conversion element is incorporated into the illumination optical system 2, and the illumination optical system 2 emits a light flux having a polarization state of p-polarized light (linearly polarized light that oscillates on the paper plane as illustrated by ‖‖). When the light source 1 is configured to emit polarized light, a polarization direction of the light emitted from the illumination optical system 2 is set so that the light has a polarization state of p-polarized light.

Anyway, all light fluxes emitted from the illumination optical system 2 and incident upon the dichroic mirror (color splitter) 3 are coincided with the p-polarized light irrespective of their wavelengths. Among the dichroic mirror 3, the first color light (illustrated as a solid line) (green light) G is reflected and travels along the first optical path, and the second color light (illustrated as a broken line) (red light) R and the third color light (illustrated as an alternate long and short dash line) (blue light) B transmit and travel along the second optical path. At this time, the spectral characteristic of the dichroic mirror 3 is set so that the first color light can be green light. The first color light G reflected on the dichroic mirror 3 enters the first polarization beam splitter 4, then passes its polarization splitting surface 4a, then enters and is optically modulated by the first reflection type liquid crystal panel (first reflection type image display element) 5. Thereafter, the light again enters the polarization splitting surface 4a of the polarization beam splitter 4. The polarization splitting surface of the polarization beam splitter 4 characteristically transmits the p-polarized light, and reflects the s-polarized light (linearly polarized light that oscillates in the direction perpendicular to the paper plane as illustrated by ••••). Therefore, the component modulated into the s-polarized light by the first reflection type liquid crystal panel 5 is reflected (as first reflected light) on the polarization splitting surface 4a of the polarization beam splitter 4, and directed to the optical path combiner 13.

On the other hand, the second color light R and the third color light B that have transmitted through the dichroic mirror 3 enter the first wavelength selective wavelength plate (wavelength selective phase difference plate) 6. This embodiment sets the second color light R to the red light and the third color light B to the blue light. The first wavelength selective wavelength plate 6 characteristically rotates only a wavelength component of the second color light R by 90° in a polarization direction. The second color light R passes the first wavelength selective wavelength plate 6, and is converted into the s-polarized light. The second color light R and the third color light B that have passed the first wavelength selective wavelength plate 6 enter the second polarization beam splitter 7. The polarization splitting surface 7a of the second polarization beam splitter 7 characteristically transmits the p-polarized light and reflects the s-polarized light or analyzes the light, similar to the polarization splitting surface 4a of the first polarization beam splitter 4. As a consequence, the second color light R is reflected on the polarization splitting surface 7a and enters the second reflection type liquid crystal panel (second reflection type image display element) 8, whereas the third color light B transmits through the polarization splitting surface 7a and enters the third reflection type liquid crystal panel (third reflection type image display element) 9.

The color light R optically modulated by the reflection type liquid crystal panel 8 and the color light B optically modulated by the reflection type liquid crystal panel 9 again enter the polarization splitting surface 7a of the second polarization splitter 7. For the p-polarized light component of the second color light (second reflected light) R and the s-polarized light component of the third color light (third reflected light) B among the light fluxes modulated by the reflection type liquid crystal panels 8 and 9 go toward the second wavelength selective wavelength plate 10 via the polarization splitting surface 7a. The second wavelength selective wavelength plate 10 characteristically rotates a polarization direction of only a wavelength component of the third color light B by 90°. As a result, the third color light B that has been modulated and converted into the s-polarized light by the reflection type liquid crystal panel 9 is reflected on the polarization splitting surface 7a, passes the second wavelength selective wavelength plate 10, and is converted into the p-polarized light. The second color light R and the third color light B that have passed the second wavelength selective wavelength plate 10 go toward the optical path combiner 13.

The first color light G passes a gap glass 11, and the second color light R and the third color light B pass the gap glass 12 before entering the optical path combiner 13. The first gap glass (first transparent member) 11 is located between the optical path combiner 13 and the polarization beam splitter 4 on the first optical path along which the first color light G travels, the second gap glass (second transparent member) 12 is located between the optical path combiner 13 and the polarization beam splitter 7 on the second optical path along which the second color light R and the third color light B travel. The optical path combiner 13 includes a polarization beam splitter, and combines the optical paths by reflecting the s-polarized light of the first color light G, and by transmitting the p-polarized light of each of the second color light R and the third color light B on the polarization splitting surface 13a. The first color light G, the second color light R, and the third color light B for which the optical paths are combined are projected onto the screen S by the projection lens 14, and image information is formed on the screen S. This is the basic structure of the projection display apparatus using the projection optical system according to this embodiment.

Figure 3:
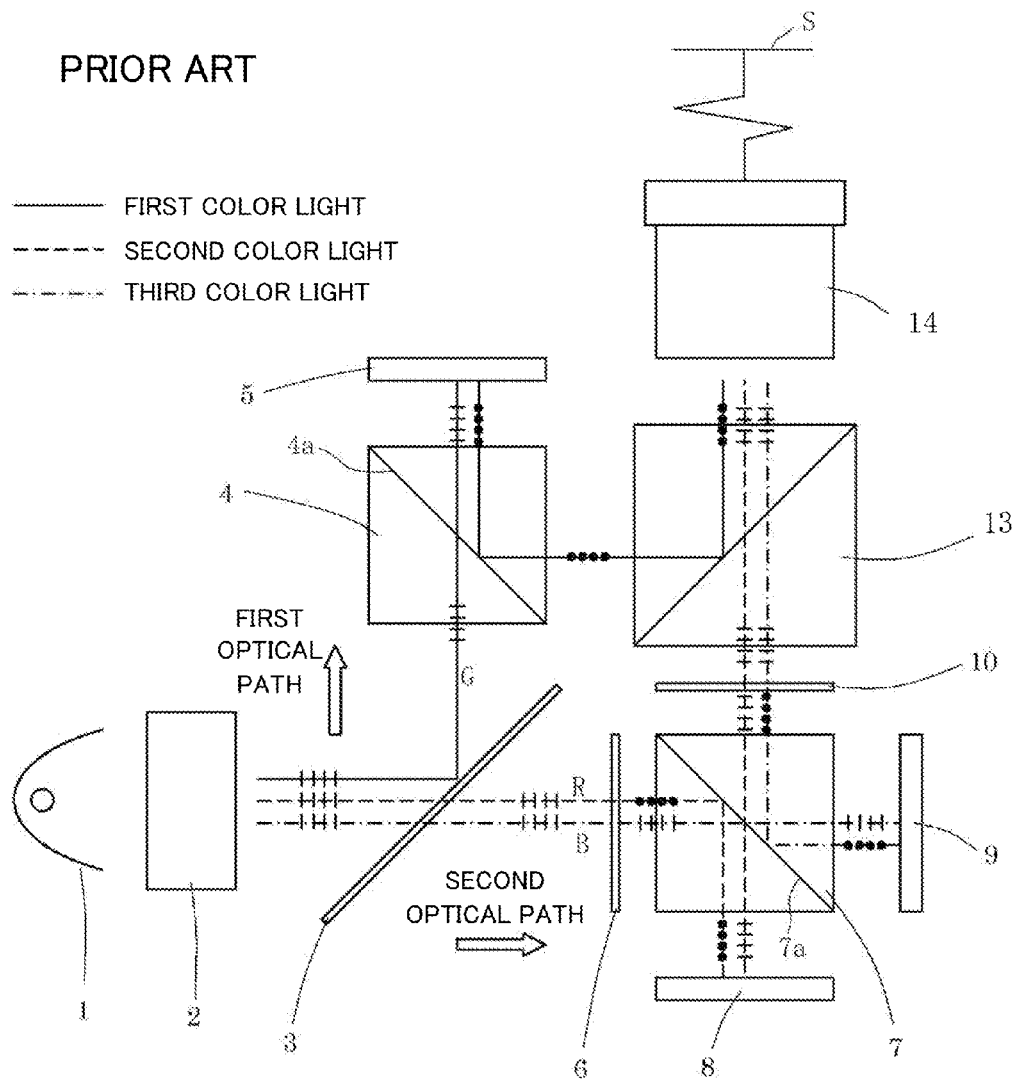
FIG. 3 is a schematic view of a principal part of a projection display apparatus using a conventional reflection type liquid crystal panel.

A description will now be given of a method of avoiding the interference pattern according to one characteristic of the present invention. A projection type display apparatus (projector) that uses the reflection type liquid crystal panel can arrange a polarization beam splitter in front of the liquid crystal panel (on the light incidence side) so as to select the light according to turning on and off of the liquid crystal panel. Hence, the color splitter and combiner system tends to become more complicated than a transmission type, but using the wavelength selective wavelength plate can provide a comparatively simple structure. Referring now to FIG. 3, a description will be given of one illustrative projection display apparatus using this structure.

When compared with FIG. 1, FIG. 3 has no first and second gap glasses 11 and 12. The light flux emitted from the light source 1 passes the illumination optical system 2, and then emitted with a uniform polarization direction. A light flux emitted from the illumination optical system 2 is divided into the first optical path and the second optical path by the dichroic mirror 3. The first color light G travels along the first optical path, and the second color light R and the third color light B travel along the second optical path. The first color light G that travels along the first optical path passes the polarization splitting surface 4a of the first polarization beam splitter 4, and then is modulated and reflected by the first reflection type liquid crystal panel 5. The modulated light is again enters the polarization splitting surface 4a of the polarization splitter 4, and the image forming light is reflected on the polarization splitting surface 4a and travels toward the optical path combiner 13.

On the other hand, the second color light R and the third color light B that travel along the second optical path pass the first wavelength selective wavelength plate 6, and consequently a polarization of one of the color light fluxes is rotated by 90°. As a result, the polarization splitting surface 7a of the second polarization beam splitter 7 allows one color light flux to pass and reflects the other color light flux so that these color light fluxes can be enter separate reflection type liquid crystal panels 8 and 9. The optical paths of the color light fluxes modulated by the reflection type liquid crystal panels 8 and 9 are combined by the polarization splitting surface 7a of the polarization beam splitter 7, and the combined light travels toward the optical path combiner 13. In this process, the combined light passes the second wavelength selective wavelength plate 10, but the polarized light fluxes that are different by 90° are agreed with each other and enter the optical path combiner 13. The optical path combiner 13 combines the color light G of the first optical path with the color light fluxes R and B of the second optical path, and leads the combined light flux to the projection lenses 14.

However, this structure may cause an interference pattern between the light fluxes emitted from the polarization beam splitter. A description will be given of a generation of the interference pattern with reference to FIG. 4. The interference pattern is mainly caused by p-polarized light that enters the polarization beam splitter 41. In general, the polarization beam splitter 41 is configured by a pair of triangular pole glass prisms 42 and 43 holding a dielectric multilayer film (polarization splitting surface) 41a. A film material of the dielectric multilayer film 41a is configured to satisfy the so-called Brewster condition in which a reflectance is zero to the p-polarized light, and a film thickness of the dielectric multilayer film 41a is configured to enhance the reflected light fluxes on respective surfaces. As a result, the dielectric multilayer film 41a characteristically transmits the p-polarized light and reflects the s-polarized light. However, due to the nature of this principle, as the incident angle upon the dielectric multilayer film 41a shifts from the Brewster angle, the p-polarized light is reflected and the polarization splitting characteristic becomes imperfect.

Figure 4:
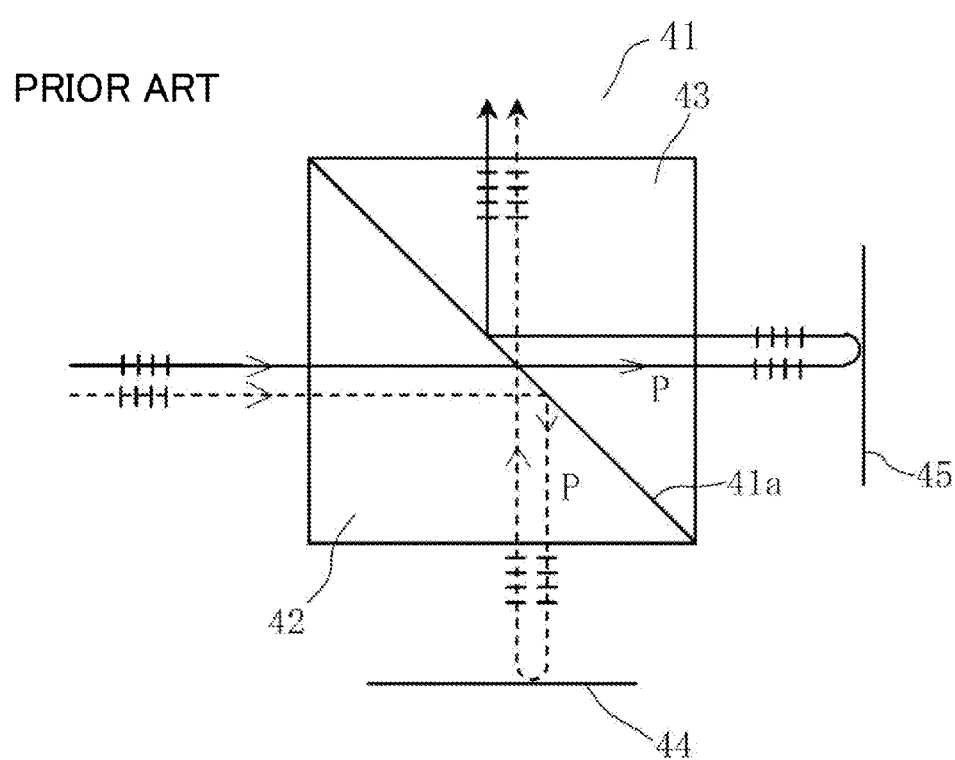
FIG. 4 is a principle explanatory view of an interference pattern that occurs on a screen.

Since the illumination light flux of the projector generally has a finite angular distribution, the p-polarized light may particularly cause non-negligible reflected light (leak light) on the dielectric multilayer film 41a. Therefore, as illustrated in FIG. 4, the p-polarized light incident upon the polarization beam splitter 41 partially causes reflected light (unnecessary light) on the polarization splitting surface 41a, and the same relationship as the so-called Michelson interferometer between the light on the reflection optical path (dotted line) and the light on the transmission optical path (solid line). As a result, an interference pattern is created by these light fluxes when a reciprocation distance difference between the optical paths of two light fluxes is within a coherent distance of the light emitted from the light source. In particular, an interference pattern stands out in a low brightness projected image in which a light amount on the transmission optical path is approximately equivalent with a light amount on the reflection optical path, and the image quality remarkably deteriorates. In the meanwhile, in FIG. 4, the reference numerals 44 and 45 denote liquid crystal panels.

In the structure of the embodiment illustrated in FIG. 1, the second reflection type liquid crystal panel 8 and the third reflection type liquid crystal panel 9 share the second polarization beam splitter 7, providing the same optical arrangement as the so-called Michelson interferometer. Assume that a reciprocation distance difference from the polarization splitting surface 7a of the second polarization beam splitter 7 for the second reflection type liquid crystal panel 8 and the third reflection type liquid crystal panel 9 to each of the liquid crystal panels 8 and 9 is within a coherent distance of the light emitted from the light source 1. Then, the normal light reflected on these two liquid crystal panels 8 and 9 and the leak light (unnecessary light) superimpose on the screen and form an interference pattern, deteriorating the image quality.

In order to avoid this interference pattern, this embodiment inserts the gap glass 11 (plane parallel plate) between the optical path combiner 13 and the polarization beam splitter 4 and the gap glass 12 (plane parallel plate) between the optical path combiner 13 and the polarization beam splitter 7. In addition, this embodiment uses glass materials having significantly different wavelength dispersion characteristics for the first gap glass 11 and the second gap glass 12.

Figure 2A:
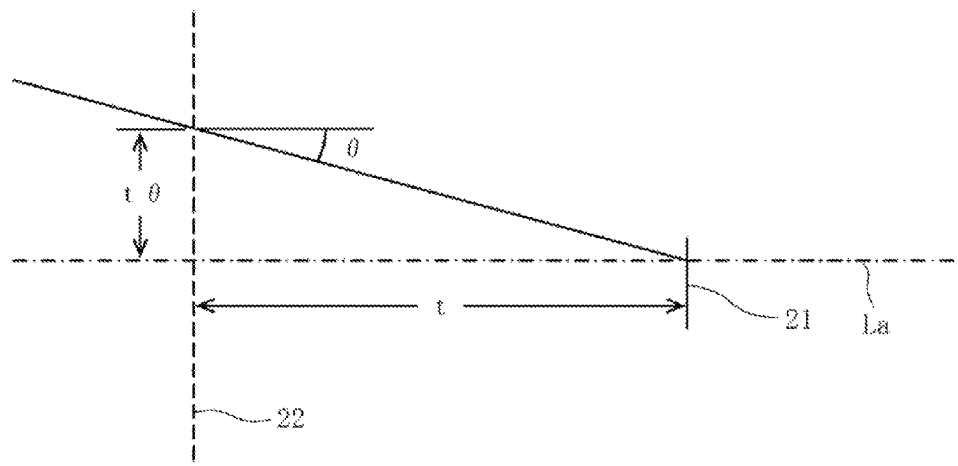
FIGS. 2A and 2B are an explanatory view of an axial chromatic aberration caused by a plane parallel plate glass.
Figure 2B:
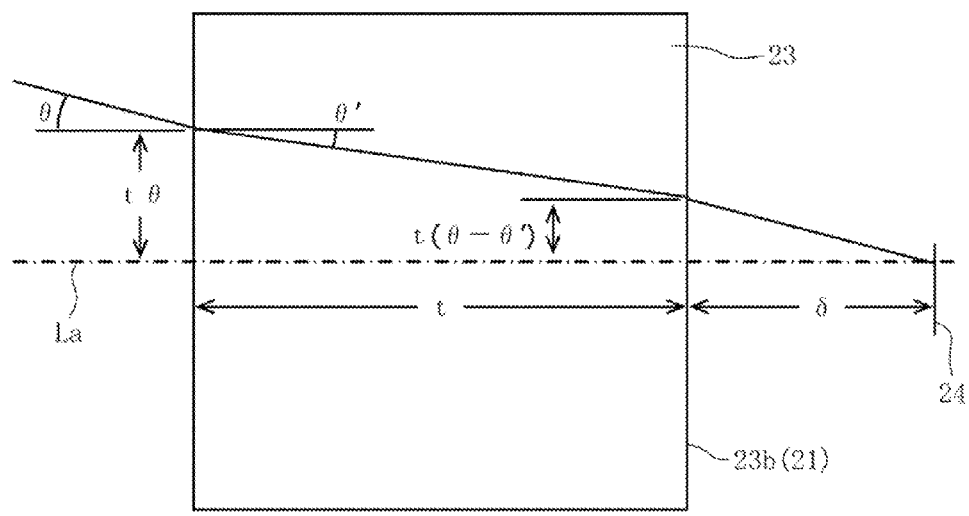

A description will now be given of an amount of an axial chromatic aberration generated when a light flux passes a plane parallel plate with reference to FIG. 2. FIG. 2A illustrates a paraxial ray when there is no plane parallel plate inserted, assuming that the ray passes a position 22 located in front of a paraxial imaging point 21 by an air gap (distance) t at a height $t\theta$ from an optical axis La at an inclination angle $\theta$. FIG. 2B illustrates that a plane parallel plate glass 23 having a refractive index n and filled in this air gap t. The inclination angle $\theta'$ of the ray incident inside of the plane parallel plate 23 becomes $\theta'=\theta/n$. Thus, in FIG. 2A, the ray passes at a height $t(\theta-\theta')$ on an exit surface 23b of the plane parallel pate 23 which is located at the paraxial imaging position 21. The ray emitted from the plane parallel plate glass 23 again proceeds at the inclination angle $\theta$, and forms an image at a position 24 that shifts from the paraxial imaging position 21 by a distance $\delta$ in FIG. 2A.

At this time, the shift amount $\delta$ becomes $\delta=t(\theta-\theta')/\theta=t(1-1/n)$. The shift amount $\delta$ is a function of the refractive index n, and its value differs according to a difference of the refractive index n depending upon a wavelength. A difference $\Delta$ of the shift amount $\delta$ between two wavelengths is an axial chromatic aberration of the plane parallel plate glass 23. The concrete difference $\Delta$ is calculated as follows for the F line (486.13 nm) and the C line (656.27 nm):

$$\Delta=\delta F-\delta C=t(1/nC-1/nF)=t\{(nF-nC)/(nC*nF)\}.$$

An Abbe number of a glass material is expressed as $vd=(nd-1)/(nF-nC)$ using the refractive index n of the d line (587.56 nm).

Then, $\Delta$ is rewritten with vd as follows:

$$\Delta=\{(nd-1)/(nC*nF)\}*(t/vd).$$

Here, the term $(nd-1)/(nC*nF)$ can be regarded as 0.2 in a refractive index range of the existing glass materials, and thus the equation of the axial chromatic aberration (difference Δ of the shift amount δ) due to the plane parallel plate glass 23 for the F line and the C line can be approximated as follows:

$$\Delta = 0.2 * (t/vd)$$

Where t1 is a thickness of the first gap glass 11, t2 is a thickness of the second gap glass 12, vd1 is an Abbe number of a material of the first gap glass 11, and vd2 is an Abbe number of a material of the second gap glass 12, the axial chromatic aberration Δ1 generated in the gap glass 11 and the axial chromatic aberration Δ2 generated in the gap glass 12 are defined as follows:

$$\Delta 1 = 0.2 \cdot (t1/vd1)$$

$$\Delta 2 = 0.2 \cdot (t2/vd2).$$

The second optical path needs to generate an axial chromatic aberration larger than the coherent distance (which is about 10 μm for a high-pressure mercury lamp) so as to prevent an interference between the normal light reflected by the second and third reflection type liquid crystal panels 8 and 9 and the leak light. Therefore, a glass type (high dispersion) may be selected so that the Abbe number vd2 can be smaller than the Abbe number vd1.

On the other hand, the first optical path does not cause an interference pattern since only the first color light G passes through it. Therefore, the Abbe number vd1 is not restricted in view of a generation of the interference pattern, but a glass material (low dispersion) can be selected so that the Abbe number vd1 can be as large as possible so as to prevent the color flare in the single color band.

When the glass thickness t1 of the firs optical path is significantly different from the glass thickness t2 of the second optical path, an amount of a spherical aberration caused by the color light that passes the first optical path is quite different from that of the color light that passes the second optical path and it becomes difficult to properly correct a spherical aberration with respect to all colors. In other words, a value of the glass thickness t1 of the firs optical path and a value of the glass thickness t2 of the second optical path may be close to each other so as to reduce the aberration.

Since the coherent distance is about 10 μm when the light source uses a high-pressure mercury lamp, the following conditions may be met so as to avoid an interference pattern and to maintain the resolving power:

$$0.01 \text{ (mm)} < 0.2 * |t1/vd1 - t2/vd2| < 0.2 \text{ (mm)}.$$

In other words, the following condition may be met:

$$0.05 \text{ (mm)} < |t1/vd1 - t2/vd2| < 1.00 \text{ (mm)} \quad (1).$$

In addition, the following condition may be met:

$$|t1-t2| < 9.0 \text{ (mm)} \quad (2)$$

When the value is lower than the lower limit of the conditional equation (1), an interference pattern occurs as a result of that an optical path length difference between the normal light and the leak light falls within the coherent distance of the light emitted from the light source for a general projector. When the value is larger than the upper limit, a generation amount of the axial chromatic aberration becomes excessively large, and a large amount of color flare occurs in the bands of the second color light R and the third color light B. When the value exceeds the upper limit of the conditional equation (2), a generation amount of a spherical aberration significantly differs between the first optical path and the second optical path and it becomes difficult to properly maintain the resolving performance for all colors.

The above equations may be changed as follows:

$$0.075 \text{ (mm)} < |t1/vd1 - t2/vd2| < 0.5 \text{ (mm)} \quad (1a)$$

$$|t1-t2| < 2.0 \text{ (mm)} \quad (2a)$$

Under these conditions, the deterioration of the resolving sense can be lessened while the interference pattern can be avoided. More specifically, the following numerical examples may be provided while the first color light is set to green, the second color light is set to red, and the third color light is set to blue.

NUMERICAL EXAMPLE 1

When t1=8.0, vd1=64.1, t2=8.0, and vd2=25.4,
Equation (1) becomes 0.19 and Equation (2) becomes 0.0.

NUMERICAL EXAMPLE 2

When t1=10.0, vd1=70.0, t2=9.0, and vd2=25.4,
Equation (1) becomes 0.211 and Equation (2) becomes 1.0.

NUMERICAL EXAMPLE 3

When t1=10.0, vd1=80.0, t2=3.0, and vd2=50.0,
Equation (1) becomes 0.065 and Equation (2) becomes 7.0.

NUMERICAL EXAMPLE 4

When t1=8.0, vd1=50.0, t2=3.0, and vd2=35.0,
Equation (1) becomes 0.075 and Equation (2) becomes 5.0.

This structure provides a difference of 38 μm (0.19×0.2=0.038 mm) between an amount of an axial chromatic aberration that occurs on the first optical path and an amount of an axial chromatic aberration that occurs on the second optical path. In other words, in the design of the projection lens, it is enough to minimize an axial chromatic aberration by considering the gap glass having the thickness of 8.0 mm and the Abbe number of 64.1. Thereby, an interference pattern between the red light R and the blue light B can be avoided due to an effect of the gap glass 12 on the second optical path. In addition, since the necessary back focus can be maintained for all color light fluxes, there is no difference in a generation amount of a spherical aberration for all color light fluxes, and a high resolving performance can be obtained for all colors.

In this embodiment, the first transparent member 11 may be joined to at least one of the first polarization beam splitter 4 or the optical path combiner 13. Similarly, the second transparent member 12 may be joined to at least one of the second polarization beam splitter 7 and the optical path combiner 13. Thereby, a manufacture assembly becomes easier. As described above, this embodiment can avoid an interference pattern, and restrain the color flare or the spherical aberration.

In particular, by inserting plate glasses having different Abbe numbers in the telecentric optical paths, the spherical aberration can be equivalently generated and only the axial chromatic aberration can be generated without affecting the chromatic difference of magnification. This embodiment utilizes this principle for the color splitter and combiner system in the reflection type liquid crystal projector, and achieves the projection display apparatus that can restrain an interference pattern or maintain the resolving sense.

The color splitter and combiner system according to the present invention may satisfy one of the following conditional equations:

$$0.05 \text{ (mm)} < t2/vd2 < 1.00 \text{ (mm)} \quad (3)$$

$$40 < vd1 \quad (4)$$

Here, t1 is a thickness of the first transparent member 11, t2 is a thickness of the second transparent member 12, vd1 is an Abbe number of a material of the first transparent member 11, and vd2 is an Abbe number of a material of the second transparent member 12.

When the conditional equation (3) is met, an interference pattern can be reduced by generating an axial chromatic aberration larger than a coherent distance (10 μm for a high-pressure mercury lamp) so that the normal light reflected by the second and third reflection type liquid crystal panels 8 and 9 on the second optical path and the leak light do not interfere with each other.

When the conditional equation (4) is met, the dispersion becomes small and the Abbe number vd1 can reduce a generation amount of the color flare in the single band.

By satisfying the above conditions, the embodiment can provide a color splitter and combiner system and a projection display apparatus having the same, which can properly maintain the image quality of a projected image, and reduce an interference pattern on the screen.

In each numerical example, the conditional equations (3) and (4) have the following values:

In the numerical example 1, the conditional equation (3) becomes 0.315 and the conditional equation (4) becomes 64.1.

In to the numerical example 2, the conditional equation (3) becomes 0.354 and the conditional equation (4) becomes 70.0.

According to the numerical example 3, the conditional equation (3) becomes 0.060 and the conditional equation (4) becomes 80.0.

According to the numerical example 4, the conditional equation (3) becomes 0.086 and the conditional equation (4) becomes 50.0.

One of the following conditions may be met:

$$0.075 \text{ (mm)} < t2/vd2 < 0.5 \text{ (mm)} \quad (3a)$$

$$45 < vd1 \quad (4a)$$

The following condition may be met:

$$50 < vd1 < 90 \quad (4b)$$

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, regarding the polarization, the color light, and a variety of optical elements, combinations other than this embodiment may be utilized. In summary, the present invention is applicable to a structure of the optical system that uses a pair of reflection type liquid crystal panels via one polarization beam splitter.

This application claims the benefit of Japanese Patent Application No. 2009-185379, filed Aug. 10, 2009, and 2010-154956 filed on Jul. 7, 2010, which are hereby incorporated by reference herein in their entirety.

What is claimed is:

1. A projection display apparatus comprising:
    a first reflection type image display element configured to display an image;
    a second reflection type image display element configured to display an image;
    a third reflection type image display element configured to display an image;
    an illumination optical system configured to illuminate the first, second and third reflection type image display elements using light from a light source;
    a color splitter and combiner system; and
    a projection optical system configured to project image light from the color splitter and combiner system, onto a screen,
    wherein the color splitter and combiner system includes:
    a first polarization beam splitter configured to lead first color light to a first reflection type image display element and to analyze first reflected light from the first reflection type image display element;
    a second polarization beam splitter configured to lead second color light to a second reflection type image display element, to analyze second reflected light from the second reflection type image display element, and to lead third color light to a third reflection type image display element, and to analyze third reflected light from the third reflection type image display element;
    an optical path combiner configured to combine the first color light emitted from the first polarization beam splitter with the second color light and the third color light that are emitted from the second polarization beam splitter;
    a first transparent plate located on an optical path between the first polarization beam splitter and the optical path combiner; and
    a second transparent plate located on an optical path between the second polarization beam splitter and the optical path combiner,
    wherein $0.05(\text{mm}) < |t1/v1 - t2/v2| < 1.00(\text{mm})$ is met, where t1 is a thickness of the first transparent plate, t2 is a thickness of the second transparent plate, v1 is an Abbe number of a material of the first transparent plate, and v2 is an Abbe number of a material of the second transparent plate, and
    wherein an interference pattern in the image light projected on the screen by the projection optical system would be created unless the projection display apparatus includes the first and second transparent plates.

2. The projection display apparatus according to claim 1, wherein $|t1-t2| < 9.0(\text{mm})$ is further met.

3. The projection display apparatus according to claim 1, wherein the first color light is green light.

4. The projection display apparatus according to claim 1, wherein the first transparent plate is joined to at least one of the first polarization beam splitter and the optical path combiner.

5. The projection display apparatus according to claim 1, wherein the second transparent plate is joined to at least one of the second polarization beam splitter and the optical path combiner.

6. The projection display apparatus according to claim 1, wherein the first transparent plate and the second transparent plate mutually have different wavelength dispersion characteristics.

7. The projection display apparatus according to claim 1, wherein the v2 is smaller than the v1.

8. The projection display apparatus according to claim 1, wherein $v1 > 40.0$ is met.

9. The projection display apparatus according to claim 1, wherein $0.075(\text{mm}) < t2/v2 < 0.5(\text{mm})$ is met.

10. The projection display apparatus according to claim 1, wherein the second color light is reflected on the second polarization beam splitter and enters the second reflection type image display element, and the third color light transmits through the second polarization beam splitter and enters the third reflection type image display element, and wherein the first color light is green light, the second color light is red light and the third color light is blue light.

11. The projection display apparatus according to claim 1, wherein all of a plurality of lenses in the projection optical system are disposed between the optical path combiner and the screen.

12. The projection display apparatus according to claim 1, wherein each of the first transparent plate and the second transparent plate is a parallel plate.

\* \* \* \* \*